United States Patent [19]

Kellermann

[11] Patent Number: 5,500,880
[45] Date of Patent: Mar. 19, 1996

[54] TRANSMISSION SYSTEM COMPRISING A SUB-BAND ECHO CANCELLER WHICH INCLUDES A SUB-BAND CODING ARRANGEMENT

[75] Inventor: Walter Kellermann, Nürnberg, Germany

[73] Assignee: U.S. Philips Corporation, New York, N.Y.

[21] Appl. No.: 359,327

[22] Filed: Dec. 16, 1994

Related U.S. Application Data

[63] Continuation of Ser. No. 106,008, Aug. 13, 1993.

[30] Foreign Application Priority Data

Aug. 18, 1992 [DE] Germany ............... 42 27 327.7

[51] Int. Cl.[6] .............. H04L 23/00; H04M 1/24; H04J 1/00
[52] U.S. Cl. .............. 375/377; 375/350; 379/3; 379/410; 370/32.1
[58] Field of Search .............. 375/377, 220, 375/219

[56] References Cited

U.S. PATENT DOCUMENTS

| | | | |
|---|---|---|---|
| 4,827,472 | 5/1989 | Ferrieu | 379/410 |
| 4,979,188 | 12/1990 | Kotzin | 375/254 |
| 5,272,695 | 12/1993 | Makino et al. | 379/410 |
| 5,297,163 | 3/1994 | Pfeiffer | 375/8 |
| 5,315,585 | 5/1994 | Iizuka et al. | 370/32.1 |
| 5,448,555 | 9/1995 | Berner | 375/222 |

FOREIGN PATENT DOCUMENTS 4123606  4/1992  Japan ............... H03H 21/00

OTHER PUBLICATIONS

"Advances in Speech Signal Processing", by S. Fair and M. Sondhi, pp. 327–356.

*Primary Examiner*—Edward L. Cole, Sr.
*Assistant Examiner*—Madeleine Anh-vinh Nguyen
*Attorney, Agent, or Firm*—Leroy Eason; Richard Weiss

[57] ABSTRACT

Transmission system comprising a sub-band echo canceller which includes a sub-band coding arrangement.

The invention relates to a transmission system comprising a sub-band echo canceller which includes a canceller that can be switched between a receive path (r) and a send path (s).

To reduce the computational complexity as well as the signal delays also with sub-band coding or sub-band decoding, the sub-band coding arrangement comprises a synthesis filter bank and an analysis filter bank which are provided for sub-band coding and also for sub-band echo cancellation.

Advantageous applications for the echo canceller are subscriber terminal units, for example, hands-free facilities for car telephones, videophones or video conference units which have an echo path formed by at least one microphone and at least one loudspeaker.

20 Claims, 1 Drawing Sheet

5,500,880

TRANSMISSION SYSTEM COMPRISING A SUB-BAND ECHO CANCELLER WHICH INCLUDES A SUB-BAND CODING ARRANGEMENT

This is a continuation of application Ser. No. 08/106,008, filed on Aug. 13, 1993.

BACKGROUND OF THE INVENTION

The invention relates to a transmission system for transmitting signals between at least two transceiver stations which comprise at least one sub-band coding arrangement and at least one sub-band echo canceller, wherein the sub-band echo canceller is provided to be coupled to a sub-band coding arrangement which coding arrangement comprises at least one synthesis filter bank and at least one analysis filter bank, the synthesis filter bank and the analysis filter bank being provided for the sub-band coding arrangement and also for the sub-band echo canceller.

The invention further relates to an echo canceller and a subscriber terminal unit which has an echo path formed by at least one microphone and at least one loudspeaker and comprises such an echo canceller, as well as a transmission system for transmitting signals between at least two transceiver stations which comprise at least one sub-band coding arrangement and at least such an echo canceller.

Sub-band echo cancellers of this type which will hereinafter be designated echo cancellers for simplicity are necessary, especially, for electrical echo cancellation in speech signals for telephone connections via satellite links and for acoustic echo cancellation in subscriber terminal units, for example, in hands-free facilities of video conference units. In these units there is an additional delay of the speech signal due to intricate and expensive picture encoding.

From "Advances in Speech Signal Processing", Sadaoki Furui, M. Mohan Sondhi, pp. 327 to 356 an echo canceller is known to comprise a canceller that can be switched between a receive path and a send path. The input and output signals of an echo path are then sent through identical analysis filter banks which produce vectors of N sub-band signals which are scanned at a reduced scanning rate. The canceller forms a vector of sub-band signals which correspond to the sub-band echo signals. The resulting sub-band errors at the output of a subtracter arrangement are sent through a synthesis filter bank to produce a full-band signal which is returned to the remote speaker.

SUMMARY OF THE INVENTION

It is an object of the invention to provide a sub-band echo canceller which can be used to advantage for sub-band coding and sub-band decoding.

This object is achieved by a sub-band echo canceller which is provided to be coupled to a sub-band coding arrangement which coding arrangement comprises at least one synthesis filter bank and at least one analysis filter bank, the synthesis filter bank and the analysis filter bank being provided for the sub-band coding arrangement and also for the sub-band echo canceller.

The invention is based on the recognition that when sub-band coding is effected independently of sub-band echo cancellation, there is an additional signal delay caused by the sub-band echo cancellation. This delay is avoided by the invention in that the functions of the synthesis and analysis filter bank of the sub-band echo canceller have been integrated with the synthesis and analysis filter bank of the sub-band encoder. The echo canceller is then arranged as a sub-band echo canceller as is known, for example, from "Advances in Speech Signal Processing" by Sadaoki Furui and M. Mohan Sondhi. The echo canceller can be connected to a sub-band coding arrangement comprised of a sub-band decoder for decoding remote-end sub-band received signals and of a sub-band encoder for coding near-end sub-band transmission signals. The echo canceller is formed by the canceller inserted between send and receive paths, a subtracter and the synthesis filter bank inserted into the receive path and the analysis filter bank inserted into the send path. The sub-band signals being produced in the sub-band coding arrangement reduce the complexity of the echo canceller. The overall processing of the sub-band received signals is effected by the echo canceller, while the synthesis filter bank and the analysis filter bank are provided for a sub-band coding and a sub-band echo cancellation. For this purpose, the canceller has a transmission function to imitate the echo path and to synthesize and analyze the sub-band coding. The integration of the sub-band echo cancellation with the sub-band coding arrangement and the consequent saving on an analysis and synthesis filter bank provides reduced computation circuitry for these filter banks, which reduces the signal delays. The echo canceller is then independent of the coding method used for the sub-band coding arrangement.

In a direct structure which is in the first place aimed at a reduction of the circuitry and cost of computation, the echo canceller comprises a synthesis filter bank which precedes an echo path at the receiver end and an analysis filter bank which follows the echo path at the transmitter end, the canceller also being provided for modelling the synthesis and the analysis for the sub-band coding.

For determining an error estimate in the direct structure the canceller is connected to the receive path between the sub-band encoder and the synthesis filter bank and, via a subtracter, to the send path between the sub-band encoder and the analysis filter bank.

Various drive possibilities for the canceller may be provided in that a first output signal of the subtracter and/or a decoded signal at the output of the decoder and/or a send signal at the output of the encoder are used for driving the canceller.

In an indirect structure of the echo canceller which specifically aims at an improved convergence behaviour, the echo canceller comprises a first synthesis filter bank preceding the echo path at the receiver end and a second synthesis filter bank following the canceller, the sub-band decoder being preceded by a first analysis filter bank which is provided for processing a signal formed from the send signal of the echo path and the output signal of the second synthesis filter bank. In contrast with the direct structure, the estimate for the echo path is not derived from sub-band signals, but from full-band signals.

A drive possibility for the canceller is provided in the indirect structure of the echo canceller in that the echo canceller comprises an identification arrangement formed by a second analysis filter bank for processing the output signal of the first synthesis filter bank, and a third analysis filter bank for processing the output signal of the echo path, a subtracter and a cancelling arrangement for driving the canceller.

Possible embodiments for the echo canceller are provided in that the echo canceller is realised by means of a digital signal processor and/or as a digital circuit.

Advantageous applications for the echo canceller are subscriber terminal units, for example, hands-free facilities for car telephones, videophones or video conference units which have an echo path formed by at least one microphone and at least one loudspeaker.

In addition, the echo canceller can be used in transmission systems for transmitting coded signals between at least two transceiver stations which have at least one sub-band coding arrangement. The echo canceller is then independent of the coding method used.

BRIEF DESCRIPTION OF THE DRAWING

In the following the invention will be further explained with reference to the exemplary embodiments shown in the drawing Figures, in which.

DESCRIPTION OF THE PREFERRED EMBODIMENTS

Figure 1:
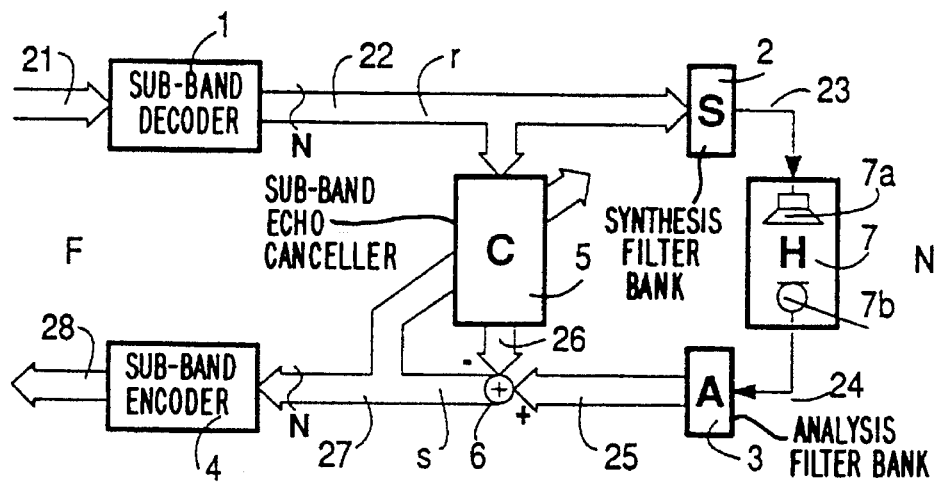
FIG. 1 shows a sub-band coding arrangement and an echo canceller in a direct structure.

The sub-band coding arrangement 1, 2, 3, 4 shown in FIG. 1 comprises a sub-band encoder 4 for coding a send signal 27 and a sub-band decoder 1 for decoding a receiving signal 21, as well as a synthesis filter bank 2 and an analysis filter bank 3 of a sub-band echo canceller 5, 6. The echo canceller 5, 6 further includes a canceller 5 inserted between a receive path r and a send path s, and also includes a subtracter 6. At the output of the sub-band decoder 1 there is a decoded received signal 22 available which is applied to the synthesis filter bank 2 and to the canceller 5. At the output of the synthesis filter bank 2 there is a speech signal 23 present as a full-band signal which is applied to a loudspeaker 7a of an echo path 7 via a digital/analog converter (not shown in FIG. 1). On the receive path r the signals transmitted from a remote end F are digitally transferred to the near end N. A microphone 7b of the echo path 7 is additionally arranged at the near end N. The signals 24 produced by the microphone 7b are applied to the analysis filter bank 3 through an analog/digital converter (not shown either). The subtracter 6 included in the send path s forms a difference signal 27 from the output signal 25 of the analysis filter bank 3 and an output signal 26 coming from the canceller 5. The difference signal 27 drives, on one hand, the canceller 5 and is, on the other hand, applied to the sub-band encoder 4. The output of the sub-band encoder 4 presents a coded send signal 28 to be transmitted or transferred.

The receiving signal 21 applied to the sub-band decoder 1, which signal comes from the far end F, comprises N sub-band signals and is produced at a sample rate which is reduced by a predeterminable factor R compared to the normal sample rate. In the sub-band decoder 1 the receiving signal is first decoded and then transferred as a decoded received signal 22 to the synthesis filter bank 2. All the signals shown in FIG. 1 are represented by their Z transform; the sub-band signals being combined in vectors of a length N which represents the number of sub-bands. The synthesis filter bank 2 converts the decoded received signal 22 into the speech signal 23 formed as a full-band signal. The speech signal 24 also formed as a full-band signal and coming from the echo path 7 passes through the analysis filter bank 3, while the sub-band signals 25, 27 produced without echo cancellation are converted into send signal 28 in the sub-band encoder 4. In the case of sub-band echo cancellation the decoded sub-band signals 22 are used as input signals for the canceller 5. The canceller 5 forms a set of sub-band estimates 26 for the echo path 7, so that the errors in sub-band signals 27 are minimized. The canceller 5 can thus be controlled by the send signals 27 to be coded. As appears from FIG. 1 the echo canceller shown in FIG. 1 does not cause any additional signal delay to occur as a result of the echo cancellation, because only one synthesis filter bank 2 or one analysis filter bank 3 is necessary. This is made possible in that the sub-band echo cancellation is integrated with the sub-band coding. In addition to the synthesis filter bank 2 and analysis filter bank 3 which are necessary for the sub-band echo cancellation anyhow, no further blocks are necessary for an analysis or synthesis. In this respect there should be borne in mind that the canceller 5 is not only to imitate echo path 7, but also the synthesis and analysis of the sub-band coding. In a matrix notation the following transmission function is provided for the canceller:

$$\underline{C}(z^R) = \underline{A}(z) \cdot \underline{H}(z) \cdot \underline{S}(z), \quad (1)$$

$$\underline{A}(z) = \frac{1}{R} \begin{pmatrix} A_o(z) & \ldots & A_o(zv^{R-1}) \\ \cdot & & \cdot \\ \cdot & & \cdot \\ \cdot & & \cdot \\ A_{N-1}(z) & \ldots & A_{N-1}(zv^{R-1}) \end{pmatrix} \quad (2)$$

$$\underline{H}(z) = \text{diag}(H(z) \ldots H(zv^p) \ldots \pi(zv^{R-1})) \quad (3)$$

$$\underline{S}(z) = \begin{pmatrix} S_o(z) & \ldots & S_{N-1}(z) \\ \cdot & & \cdot \\ \cdot & & \cdot \\ \cdot & & \cdot \\ S_o(zv^{R-1}) & \ldots & S_{N-1}(zv^{R-1}) \end{pmatrix} \quad (4)$$

$$v = e^{j2\pi/R} \quad (5)$$

and A(z) and S(z) define the transfer function of the synthesis filter bank 2 and the analysis filter bank 3 and the underlined functions denote sub-band signals.

Figure 2:
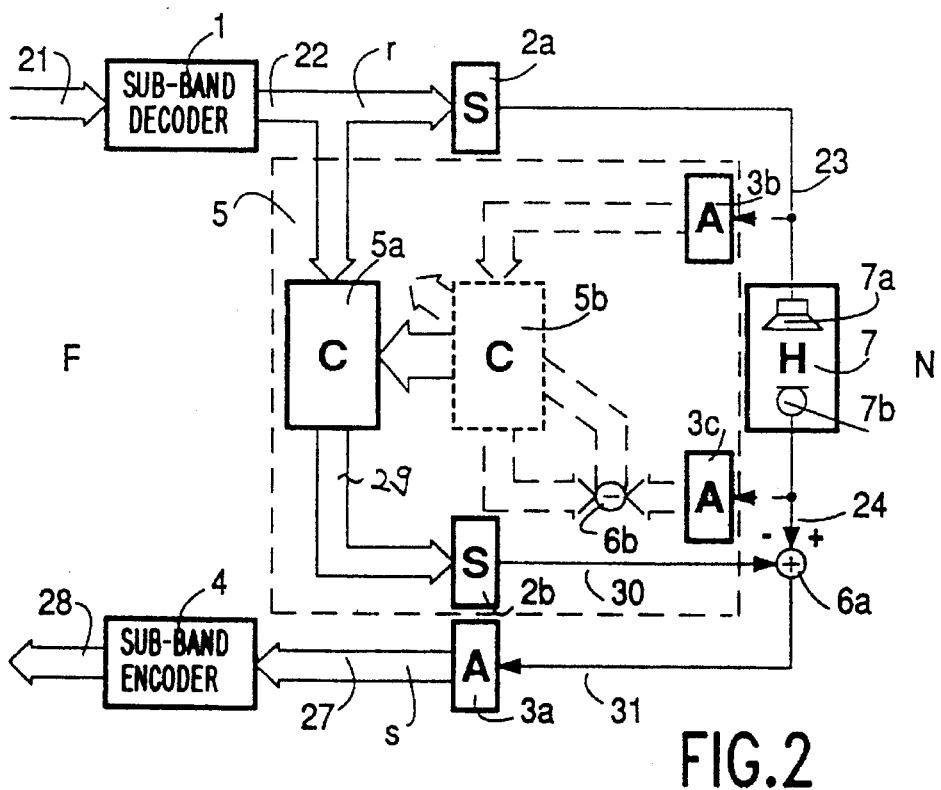
FIG. 2 shows a sub-band coding arrangement and an echo canceller in an indirect structure.

In the echo canceller 5, 6a shown in FIG. 2 the reference characters used with respect to FIG. 1 are used once again. The sub-band coding arrangement 1, 2a, 3a, 4 again comprises a sub-band encoder 4 for coding a send signal 27 and a sub-band decoder 1 for decoding a receiving signal 21 and includes a synthesis filter bank 2a and an analysis filter bank 3a. The echo canceller 5, 6a further includes a canceller 5 inserted between a receive path r and a send path s, and also includes a subtracter 6a. At the output of the sub-band decoder 1 there is a decoded received signal 22 available which is applied to the synthesis filter bank 2 and to the canceller 5. At the output of the synthesis filter bank 2a there is a speech signal 23 present as a whole-band signal which is applied, after digital/analog conversion (not shown in FIG. 2), to a loudspeaker 7a of an echo path 7. In addition, a microphone 7b is arranged at the near end N, while speech signals 24 delivered by the microphone 7b are applied to a subtracter 6a after analog/digital conversion. A full-band signal 31 supplied by the subtracter 6a is applied to a first analysis filter bank 3a whose output presents in the send path s a send signal 27 to be coded. The send signal 27 to be coded is applied to the sub-band encoder 4 whose output presents a coded send signal 28 to be transmitted. The canceller 5 comprises a first canceller arrangement 5a whose output presents an erroneous echo signal 29; this signal is convened into an erroneous full-band signal 30 via a second synthesis filter band 2b. This erroneous full-band signal 30 is subtracted from the speech signal 24 delivered by the microphone 7b. The echo canceller arrangement 2a, 3a, 5, 6a shown in FIG. 2 further includes an identification arrangement 3b, 3c, 5b, 6b which comprises a second analysis filter bank 3b for processing the output signal 23 of the first synthesis filter bank 2a and includes a third analysis filter bank 3c for processing the output signal 24 of the microphone 7b, a subtracter 6b and a second echo canceller arrangement 5b for driving the first echo canceller arrangement 5a.

The echo canceller 5, 6a shown in FIG. 2 has an "indirect" structure in contrast with the echo canceller shown in FIG. 1, the main difference between the two echo cancellers being the fact that in the exemplary embodiment shown in FIG. 2 the error signal is not produced as a sub-band signal but as a full-band signal. As a result, the second additional synthesis filter bank 2b is needed for the echo estimates 30, but the circuitry necessary for the first canceller arrangement 5a to imitate the analysis and synthesis is omitted.

Figure 3:
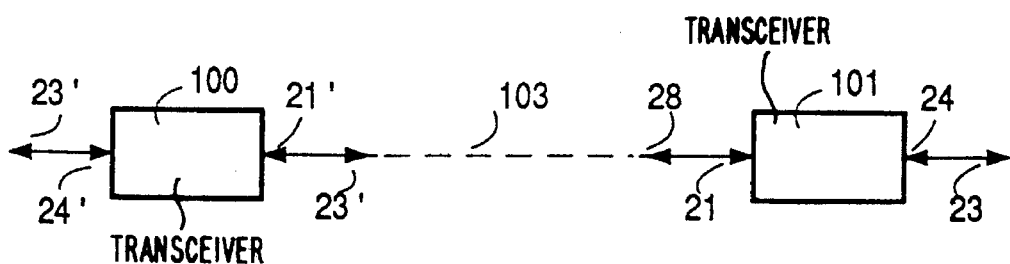
FIG. 3 shows a digital transmission system.

FIG. 3 shows a transmission system which is suitable, for example, for transmitting video signals for video conference links. The transmission system comprises a first transceiver arrangement 100 at a first end and a second transceiver arrangement 101 at a second end of the transmission system. The transceivers 100, 101 are interconnected via a transmission channel 103 which is formed, for example, by a satellite transmission link. The transceivers 100, 101 comprise, for example, an echo canceller as is shown in FIG. 1 and FIG. 2. The first transceiver 100 receives a receiving signal 21' which is based on a send signal 28 from the second transceiver 101. The second transceiver receives a receiving signal 21 which is formed by the send signal 28' from the first transceiver. The echo cancellers of the transceivers 100, 101 produce speech signals 23, 23' and, alternatively, process speech signals 24, 24' from an echo path (not shown in FIG. 3).

Further information especially as regards sub-band echo cancellation can be taken from the following publications:

W. Kellermann, Analysis and design of multirate systems for cancellation of acoustical echoes. Proc. ICASSP 88, pp. 2570–2573, New York, N.Y., USA, April 1988.

A. Gilloire and M. Vetterli, Adaptive filtering in sub-bands, Proc. ICASSP 88, pp. 1572–1576, New York, N.Y., USA, April 1988.

M. M. Sondhi and W. Kellermann, Echo cancellation for speech signals, in speech signals, In S. Furui and M. M. Sondhi, eds., Advances in speech signal processing, Marcel Dekker, inc., 1991.

D. Slock, Fractionally-spaced sub-band and multiresolution adaptive filters, in Proc. ICASSP 91, pp. 3693–3696, Toronto, Canada, May 1991.

I claim:

1. A transmission system for transmitting signals between at least two transceiver stations, each said transceiver station comprising:
   (a) at least one sub-band encoding-decoding arrangement for multi-sub-band encoded signals including a sub-band decoder and a sub-band encoder,
   (b) at least one sub-band echo canceller coupled to the sub-band encoding-decoding arrangement,
   (c) said sub-band encoding-decoding arrangement comprising:
      (i) at least one synthesis filter bank for receiving a decoded sub-band signal from the sub-band decoder and forming a full-band speech signal,
      (ii) at least one analysis filter bank for analysing a full-band speech signal and forming therefrom a sub-band signal to be sent to the sub-band encoder,
   (d) the synthesis filter bank and the analysis filter bank being connected for processing signals of the sub-band encoding-decoding arrangement,
   (e) the synthesis filter bank and the analysis filter bank also being connected for processing signals of the sub-band echo canceller.

2. The transmission system as claimed in claim 1, wherein the sub-band coding arrangement comprises a sub-band encoder for coding a send signal and a sub-band decoder for decoding a receiving signal.

3. The transmission system as claimed in claim 2, wherein the synthesis filter bank precedes an echo path at the receiver end and the analysis filter bank follows the echo path at the transmitter end, the canceller also being provided to model the synthesis and the analysis for the sub-band encoding.

4. The transmission system as claimed in claim 2, wherein the canceller is connected to the receive path between the sub-band decoder and the synthesis filter bank and, via a subtracter, to the send path (s) between the analysis filter bank and the sub-band encoder.

5. The transmission system as claimed in claim 2, wherein a first output signal of the subtracter and/or a decoded signal at the output of the sub-band decoder and/or a send signal at the output of the sub-band encoder are provided for driving the canceller.

6. The transmission system as claimed in claim 2, wherein the sub-band echo canceller comprises a first synthesis filter bank preceding the echo path at the receiver end and a second synthesis filter bank following a first canceller arrangement of the canceller, and a first analysis filter bank precedes a first subtracter of the canceller, which first analysis filter bank is provided for processing a signal formed from the send signal of the echo path and the output signal of the second synthesis filter bank.

7. The transmission system as claimed in claim 2, wherein the sub-band echo canceller comprises an identification arrangement which is formed by a second analysis filter bank for processing the output signal of the first synthesis filter bank, a third analysis filter bank for processing the output signal of the echo path, a second subtracter and a second canceller arrangement to drive the first canceller.

8. The transmission system as claimed in claim 2, wherein the sub-band echo canceller is structured by means of a digital signal processor and/or as a digital circuit.

9. The transmission system as claimed in claim 1, wherein characterized the synthesis filter bank precedes an echo path at the receiver end and in that the analysis filter bank follows the echo path at the transmitter end, the canceller also being provided to control the synthesis and the analysis for the sub-band encoding.

10. The transmission system as claimed in claim 9, wherein the canceller is connected to the receive path between the sub-band decoder and the synthesis filter bank and, via a subtracter, to the send path (s) between the analysis filter bank and the sub-band encoder.

11. The transmission system as claimed in claim 9, wherein a first output signal of the subtracter and/or a decoded signal at the output of the sub-band decoder and/or a send signal at the output of the sub-band encoder are provided for driving the canceller.

12. The transmission system as claimed in claim 1, wherein characterized the canceller is connected to the receive path between the sub-band decoder and the synthesis filter bank and, via a subtracter, to the send path (s) between the analysis filter bank and the sub-band encoder.

13. The transmission system as claimed in claim 12, wherein a first output signal of the subtracter and/or a decoded signal at the output of the sub-band decoder and/or a send signal at the output of the sub-band encoder are provided for driving the canceller.

14. The transmission system as claimed in claim 1, wherein characterized a first output signal of the subtracter and/or a decoded signal at the output of the sub-band decoder and/or a send signal at the output of the sub-band encoder are provided for driving the canceller.

15. The transmission system as claimed in claim 1, wherein characterized the sub-band echo canceller comprises a first synthesis filter bank preceding the echo path at the receiver end and a second synthesis filter bank following a first canceller arrangement of the canceller, and a first analysis filter bank precedes a first subtracter of the canceller, which first analysis filter bank is provided for processing a signal formed from the send signal of the echo path and the output signal of the second synthesis filter bank.

16. The transmission system as claimed in claim 15, wherein the sub-band echo canceller comprises an identification arrangement which is formed by a second analysis filter bank for processing the output signal of the first synthesis filter bank, a third analysis filter bank for processing the output signal of the echo path, a second subtracter and a second canceller arrangement to drive the first canceller.

17. The transmission system as claimed in claim 1, wherein the sub-band echo canceller comprises an identification arrangement which is formed by a second analysis filter bank for processing the output signal of the first synthesis filter bank, a third analysis filter bank for processing the output signal of the echo path, a second subtracter and a second canceller arrangement to drive the first canceller.

18. The transmission system as claimed in claim 1, wherein characterized the sub-band echo canceller is structured by means of a digital signal processor and/or as a digital circuit.

19. A subscriber terminal unit comprising:
 (a) at least one microphone,
 (b) at least one loudspeaker forming with the microphone an echo path,
 (c) at least one sub-band encoding-decoding arrangement multi-sub-band encoded signals including a sub-band decoder and a sub-band encoder,
 (d) at least one sub-band echo canceller coupled to the sub-band encoding-decoding arrangement,
 (e) said sub-band encoding-decoding arrangement comprising:
  (i) at least one synthesis filter bank for receiving a decoded sub-band signal from the sub-band decoder and forming a full-band speech
  (ii) at least one analysis filter bank for analysing a full-band speech signal and forming therefrom a sub-band signal to be sent to the sub-band encoder,
 (f) the synthesis filter bank and the analysis filter bank being connected for processing signals of the sub-band encoding-decoding arrangement,
 (g) the synthesis filter bank and the analysis filter bank also being connected for processing signals of the sub-band echo canceller.

20. A subscriber terminal unit comprising:
 (a) at least one microphone,
 (b) at least one loudspeaker forming with the microphone an echo path,
 (c) a sub-band decoder for receiving a full-band signal and forming sub-band signals along a receive path,
 (d) a sub-band encoder for receiving sub-band signals from a send path and forming full-band signals,
 (e) a synthesis filter bank connecting the receive path to the loudspeaker and forming full-band signals,
 (e) an analysis filter bank connected to the microphone and forming sub-band signals,
 (f) a subtracter,
 (g) a sub-band echo canceller connected to receive sub-band signals from the receive and from the send path,
 (e) said subtracter having inputs connected to receive sub-band signals from the sub-band echo canceller and from the analysis filter and having an output connected to the send path.

* * * * *